US008719643B2

(12) United States Patent
Shimada et al.

(10) Patent No.: US 8,719,643 B2
(45) Date of Patent: May 6, 2014

(54) TROUBLESHOOTING SUPPORT METHOD, AND TROUBLESHOOTING SUPPORT APPARATUS

(75) Inventors: Kuniaki Shimada, Kawasaki (JP);
Yasuhide Matsumoto, Kawasaki (JP);
Yukihiro Watanabe, Kawasaki (JP);
Yuji Wada, Kawasaki (JP); Masazumi Matsubara, Kawasaki (JP); Kenji Morimoto, Bunkyo (JP); Akira Katsuno, Kawasaki (JP); Keiichi Oguro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 756 days.

(21) Appl. No.: 12/952,462

(22) Filed: Nov. 23, 2010

(65) Prior Publication Data
US 2011/0066939 A1 Mar. 17, 2011

Related U.S. Application Data

(63) Continuation of application No. PCT/JP2008/059746, filed on May 27, 2008.

(51) Int. Cl.
*G06F 11/00* (2006.01)

(52) U.S. Cl.
USPC .......................................................... 714/46

(58) Field of Classification Search
USPC .......... 714/25–27, 30–33, 39–41, 44–4, 47.1, 714/48, 576
See application file for complete search history.

(56) References Cited

U.S. PATENT DOCUMENTS

| 5,991,897 | A | * | 11/1999 | Perugini et al. | 714/27 |
| 6,002,868 | A | * | 12/1999 | Jenkins et al. | 717/105 |
| 6,446,058 | B1 | * | 9/2002 | Brown | 706/60 |
| 7,337,404 | B2 | * | 2/2008 | Rollins | 715/747 |
| 7,464,102 | B2 | * | 12/2008 | Colleran et al. | 1/1 |

(Continued)

FOREIGN PATENT DOCUMENTS

| JP | 04-150641 | 5/1992 |
| JP | 2002-328816 | 11/2002 |
| JP | 2005-234987 | 9/2005 |
| JP | 2005-316998 | 11/2005 |

OTHER PUBLICATIONS

Easy PC Weekly; "Trouble Shooting on Windows 98"; Feb. 16, 1999; Issue 47, vol. 3; pp. 13-16.

(Continued)

*Primary Examiner* — Nadeem Iqbal
(74) *Attorney, Agent, or Firm* — Greer Burns & Crain Ltd.

(57) ABSTRACT

When a problem occurs in a computer system, the following processing is performed. That is, a troubleshooting procedure that includes, at least, operation content and input request for system information, presented to an operator, and in which command to acquire system information related to the input request from the information source of the system information are assigned to the input request, is referenced. Furthermore, in accordance with the command, system information is collected from an information source where system information exists. Then, after those input request for system information have been removed from the troubleshooting procedure, the resultant troubleshooting procedure is presented to the operator. Thus, the workload of the operator in the troubleshooting operation can be significantly reduced, and the time until the operation is completed is shortened, making rapid troubleshooting possible.

9 Claims, 11 Drawing Sheets

(56) References Cited

U.S. PATENT DOCUMENTS

| | | | |
|---|---|---|---|
| 7,770,073 B2 * | 8/2010 | Fashchik et al. | 714/48 |
| 2003/0028825 A1 * | 2/2003 | Hines | 714/37 |
| 2004/0109018 A1 * | 6/2004 | Rollins | 345/736 |
| 2005/0234973 A1 | 10/2005 | Zeng et al. | |
| 2008/0004841 A1 * | 1/2008 | Nakamura | 702/186 |
| 2008/0209255 A1 * | 8/2008 | Seguin et al. | 714/2 |

OTHER PUBLICATIONS

English Translation of International Preliminary Report on Patentability issued in International App. No. PCT/JP2008/059746, mailed Dec. 9, 2010.

* cited by examiner

FIG.7

| TROUBLESHOOTING PROCEDURE | |
|---|---|
| RULE | APPLICATION A IS HUNG UP |
| PRESENTATION CONTENT | EXECUTE shutdown.exe --s WITH 192.168.0.103 |
| INPUT ELEMENT | COMPLETION BUTTON |

TROUBLESHOOTING SUPPORT METHOD, AND TROUBLESHOOTING SUPPORT APPARATUS

CROSS REFERENCES TO RELATED APPLICATION

This application is a continuation of an international application PCT/JP2008/059746, which was filed on May 27, 2008, the entire contents of which are incorporated herein by reference.

FIELD

The present invention relates to a technique that presents a procedure for solving problems occurring in computer systems, and supports troubleshooting operations.

BACKGROUND

In recent years, the structures of computer systems have tended to become large and complicated. Moreover the causes of problems occurring in computer system operation administration have increased, and the troubleshooting procedures have become diversified. As a result, for an operator performing troubleshooting operations at the site of the operations administration, it has been getting difficult to select appropriate troubleshooting procedures. Furthermore, since the troubleshooting procedures are complicated, mistakes due to the operator are also likely to occur. Therefore, the following technique is proposed in order to simplify such troubleshooting operations.

That is, troubleshooting procedures (solution knowledge) produced from past troubleshooting cases are stored in a database. Moreover, when a problem occurs, the operator is instructed to input system information related to the system components, the operating environment, and the like, in which the problem occurs. Then, a troubleshooting procedure whose application conditions match the information input by the operator is presented to the operator from the stored troubleshooting procedures. Furthermore, the operator performs troubleshooting operations with reference to this. (refer to "Japanese Laid-open (Kokai) Patent Application Publication No. H04-150641".)

However, in the troubleshooting operation as described above, the system information that the operator is instructed to input is not always easy for the operator to acquire. For example, it is assumed that in the case in which a problem occurs in a server, the troubleshooting procedure will differ depending on whether or not the concerned server is a load balancing object. In this case, it is necessary for the operator to input whether the concerned server is a load balancing object or not. At this time, the operator has to perform investigative operations such as investigating the environmental settings of the concerned server, investigating configuration management information from a configuration management database (CMDB: System configuration management database), and the like, in order to specify whether or not the concerned server is a load balancing object.

As a result, although troubleshooting needs to be done promptly when a problem occurs, a lot of time is required for such investigative operations. Therefore there is a problem in that the troubleshooting is delayed as a result.

SUMMARY

According to an aspect of the present invention, when a problem occurs in a computer system, the following processing is performed. That is, there is referenced a troubleshooting procedure that comprises, at least, operation content and an input request for system information, presented to an operator, and in which command to acquire system information related to the input request from the information source of the system information are assigned to the input request. Furthermore, in accordance with the command, system information is collected from an information source where system information exists. Then, after those input request for the collected system information have been abridged from the troubleshooting procedure, the resultant troubleshooting procedure is presented to the operator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7 is an explanatory diagram of a troubleshooting procedure after the abridging process.

DETAILED DESCRIPTION OF THE PREFERRED EMBODIMENTS

Figure 1:
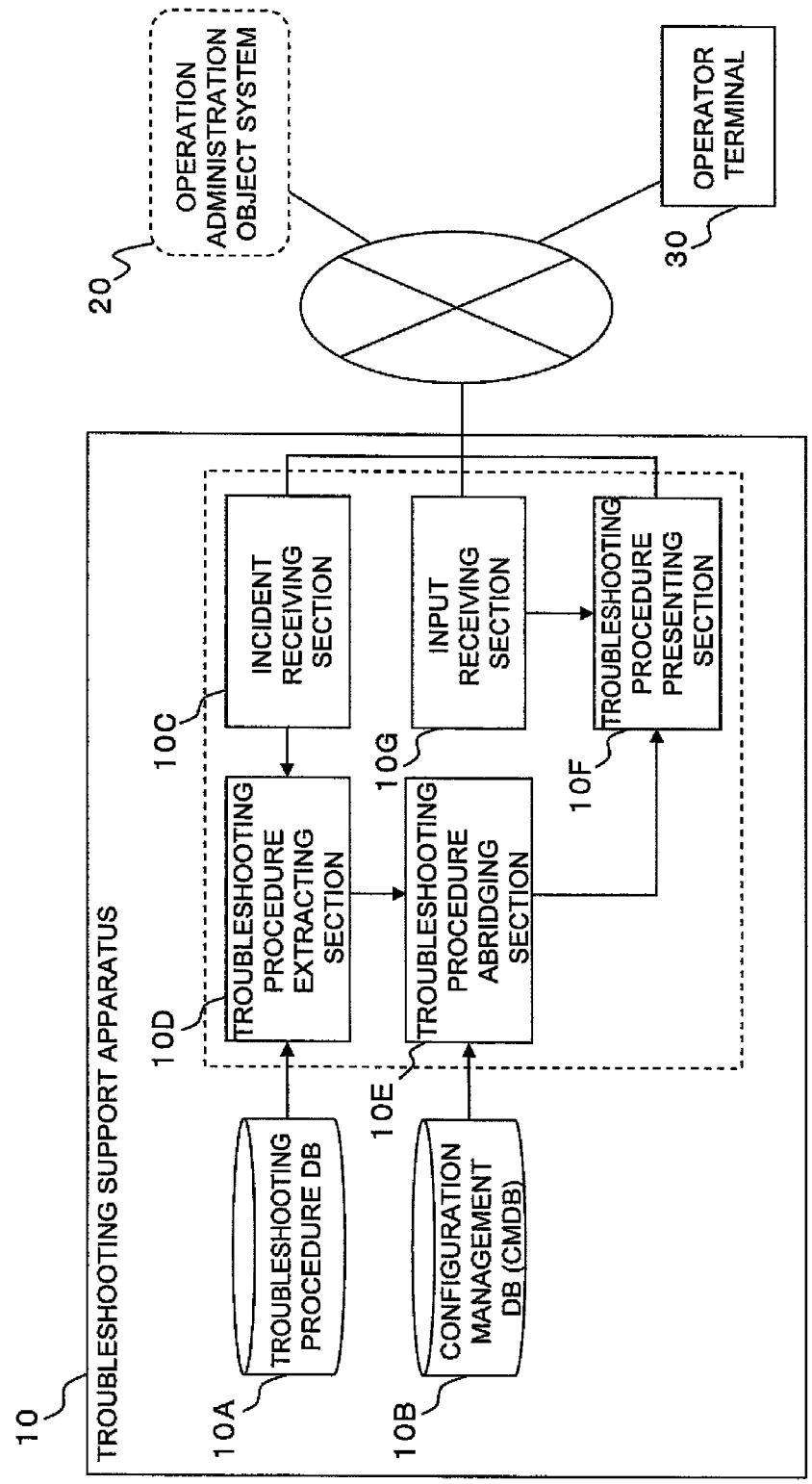
FIG. 1 is an explanatory diagram of the structure of a troubleshooting system.

FIG. 1 is an explanatory diagram illustrating the overall structure of a troubleshooting system. The troubleshooting system contains; a troubleshooting support apparatus 10 for presenting troubleshooting procedures, an operations administration object system 20, which is a computer system, being an object of operations administration, and an operator terminal 30, which an operator, who performs troubleshooting operations on problems occurring in the operations administration system 20, operates. Moreover when a problem occurs in the operations administration object system 20, the troubleshooting support apparatus 10 presents a troubleshooting procedure for the problem to the operator terminal 30.

The troubleshooting procedure support apparatus 10 and the operator terminal 30 are computers, which are provided with at least a CPU (Central Processing Unit) and memory.

Moreover, as an example of the operations administration object system 20, a client server type computer system is given. However, this is not a limitation, and computer systems with any construction are applicable. Furthermore the troubleshooting support apparatus 10, the operator terminal 20, and the operations administration object system 30 are connected to each other via a network.

Next is a description of the structure of the troubleshooting support apparatus 10.

The troubleshooting support apparatus 10 contains a troubleshooting procedure database (referred to hereunder as "DB") 10A and a configuration management DB 10B. Furthermore, the troubleshooting support apparatus 10 contains an incident receiving section 10C, a troubleshooting procedure extracting section 10D, a troubleshooting procedure abridging section 10E, a troubleshooting procedure presenting section 10F, and an input receiving section 10G. The respective configurations are all realized by execution of a troubleshooting support program loaded in the memory of the troubleshooting support apparatus 10. The trouble shooting support program may be recorded on a computer readable recording medium such as a CD-ROM, a DVD-ROM, a floppy disk, a magnetic tape or the like.

The troubleshooting procedure DB 10A stores troubleshooting procedures created from troubleshooting solution knowledge based on past troubleshooting cases.

The configuration management DB 10B stores consolidated configuration management information related to each of the system components. As an example of the configuration management DB 10B, a CMDB typically used for system operations administration can be given.

When a problem occurs in the operations administration object system 30, the incident receiving section 10C receives incident information containing the content of the problem and information that specifies the system components that are the source of the occurrence of the problem, from the operations administration object system 30.

The troubleshooting procedure extracting section 10D extracts a troubleshooting procedure whose application conditions match the content of the problem specified by the received incident information, from the troubleshooting procedure DB 10A.

The troubleshooting procedure abridging section 10E references the acquired troubleshooting procedure, and removes elements that can be removed.

The troubleshooting procedure presenting section 1 OF transmits (presents) a troubleshooting procedure, in which those elements that can be removed are removed, to the operator terminal 30.

The input receiving section 10G receives information with respect to the transmitted troubleshooting procedure, which is input in the operator terminal 30.

Figures 2, 3:
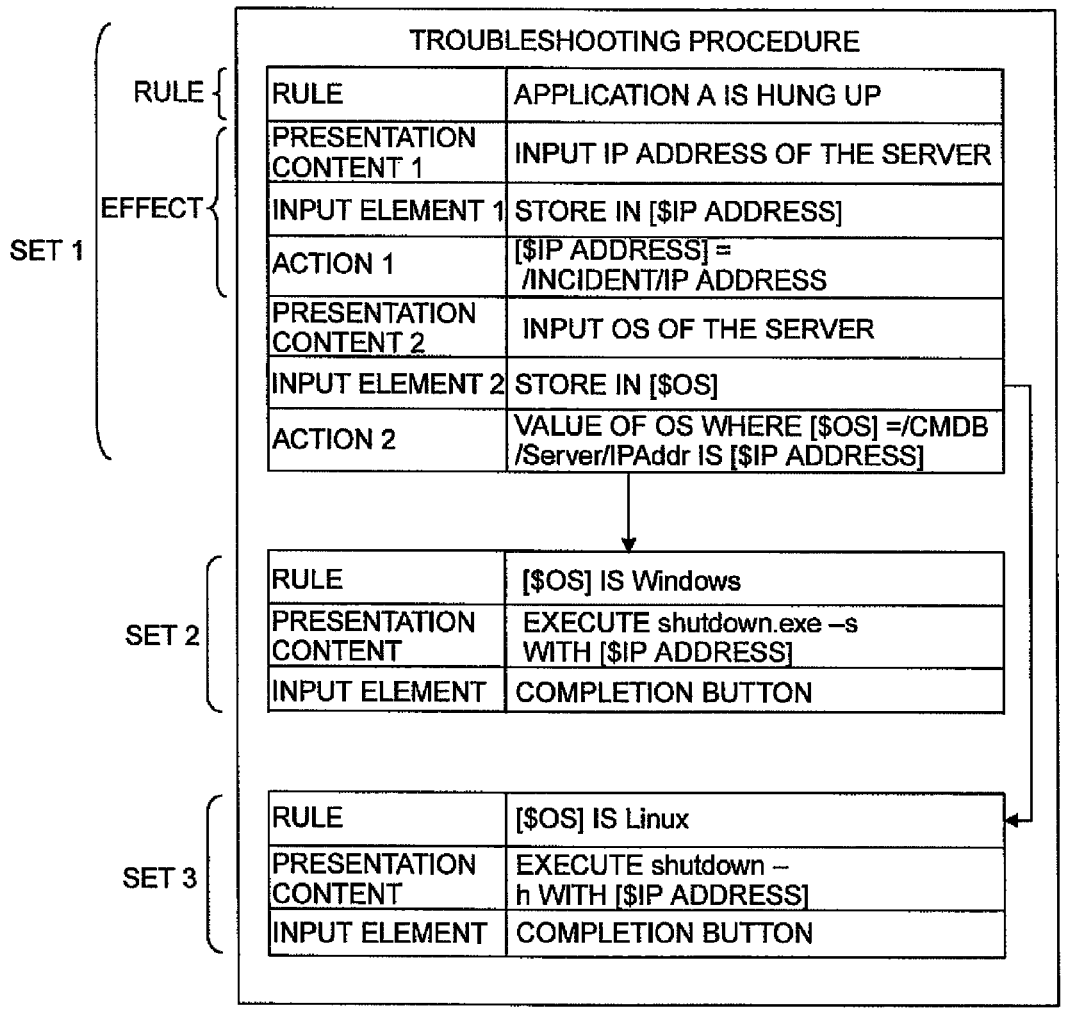
FIG. 2 is an explanatory diagram of the data structure of a troubleshooting procedure.
FIG. 3 is an explanatory diagram of the data structure of incident information.

FIG. 2 illustrates an example of the data structure of a troubleshooting procedure stored in the troubleshooting procedure DB 10A. In the troubleshooting procedure, a "rule" and an "effect" are defined as one set (a set of a rule and an effect is referred to simply as a "set" for the convenience of description, and similarly hereunder), and one, or a plurality of them combined, constitutes one troubleshooting procedure.

"Rule": describes the application conditions for each of the sets. The application conditions established for the rule of the first set in the troubleshooting procedure (referred to as "set 1" for the convenience of description, and similarly hereunder) can be also used as the application conditions for the troubleshooting procedure itself.

"Effect": describes the specific content of the troubleshooting procedure presented to the operator in each of the sets.

Furthermore, an effect includes the following.

"Presentation Content": describes the operational instructions as a specific troubleshooting procedure to the operator. The presentation content includes at least operation content, and at least one input request for system information necessary to present a troubleshooting procedure, presented to the operator. Moreover, each item of presentation content has an input element attached indicating how the operator should input it, or how the input content is processed. An input element, in the case in which the presentation content is an input request for system information, directs instructing the operator terminal 30 to request the operator to input specific information by displaying a form such as a text box or the like, and storing the input specific information in an internal variable or the like. Furthermore, in the case in which the presentation content is operation content, it sometimes displays just a button or the like, and specifies whether or not the button is pressed. For example, input element 1 in set 1 as illustrated in FIG. 2 means that the IP address that the operator is requested to input in the presentation content 1 is input, and the input IP address is stored in "$IP address", being an internal variable. Moreover, the input element in set 2 indicates simply displaying a completion button, and confirming whether it is pressed or not.

Furthermore, in the troubleshooting procedure in the present system, in the case in which the system information associated with an input request can be automatically collected instead of from input by the operator, the "action" described in the following is attached.

"Action": indicates a command to acquire system information associated with the input request from the information source of the system information instead of being input by the operator. The action indicates specifically from which information source to acquire the requested input. For examples of information sources from which system information is acquired, incident information and the configuration management DB 10B are given.

As in set 1 in the troubleshooting procedure in FIG. 2, there are cases in which there is a procession of a plurality of effects corresponding to one rule. Moreover, there is a case in which in a plurality of rules in one troubleshooting procedure, branching conditions are set that are exclusive to each other. In the example of FIG. 2, the application conditions in the rule of set 2 and set 3 are exclusive, so either one of them may be applied depending on the value of [$OS (Operating System)].

FIG. 3 illustrates the data structure of the incident information. The incident information contains information that specifies the content of a problem and the source of the problem as illustrated in FIG. 3. In this example, the IP address of a system component at the source of the problem is specified.

Next is a description of a first troubleshooting procedure presenting process, which is realized by the incident receiving section 10C, the troubleshooting procedure extracting section 10D, the troubleshooting procedure abridging section 10E, the troubleshooting procedure presenting section 10F, and the input receiving section 10G, of the troubleshooting procedure support apparatus 10.

Figure 4:
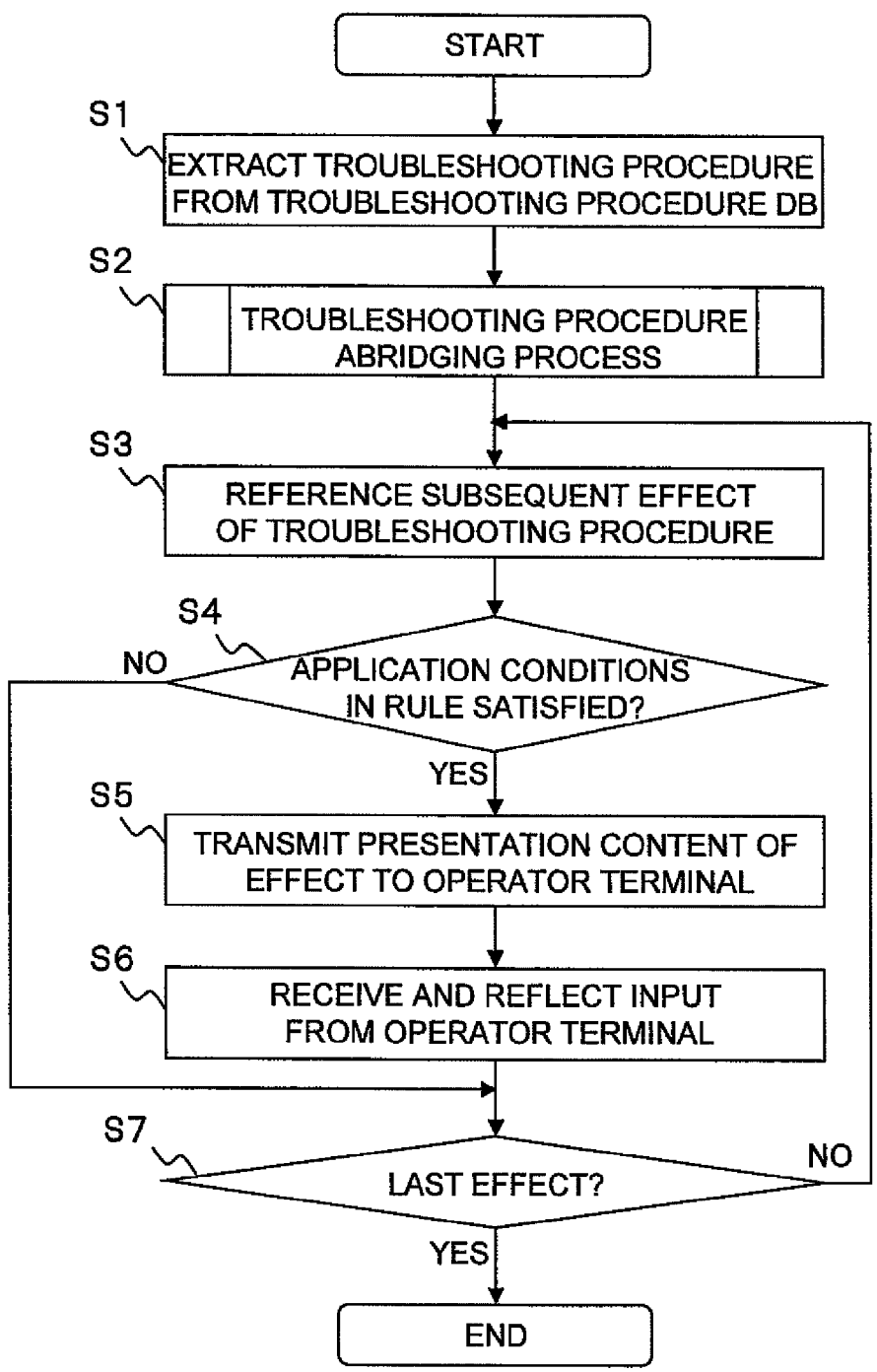
FIG. 4 is a flow chart of the content of a first troubleshooting procedure presenting process.

FIG. 4 illustrates the content of the first troubleshooting procedure presenting process. This process is executed when the incident receiving section 10C receives incident information from the operations administration object system 30.

In step 1 (abbreviated to "S1" in the figure, and similarly hereunder), depending on the content of the problem specified by the received incident information, a troubleshooting procedure in which the application conditions established in the rules are satisfied, is acquired from the troubleshooting procedure DB 10A.

In step 2, a subroutine for the troubleshooting procedure abridging process is called.

In step 3, as a result of the subroutine of the troubleshooting procedure abridging process being executed, the subsequent effect is referenced, which is contained in a troubleshooting procedure in which elements that can be removed from the troubleshooting procedure are removed.

In step 4, it is determined whether or not the application conditions established in the rule of a set in which the referenced effect is contained, are satisfied. If the application conditions of the rule are satisfied, control proceeds to step 5 (Yes), and if the application conditions of the rule are not satisfied, control proceeds to step 7 (No).

In step 5, the presentation content of the referenced effect is transmitted to the operator terminal 30. The operator terminal 30 which receives this presentation content, receives the input requested by the presentation content, from the operator.

In step 6, the input content is received from the operator terminal 30, and this is reflected to an internal variable or the like depending on the input element of the concerned effect.

In step 7, it is determined whether or not the concerned effect is the last effect of the abridged troubleshooting procedure. In the case in which the effect is the last effect of the abridged troubleshooting procedure, the processing is terminated (Yes). In the case in which the effect is not the last effect of the abridged troubleshooting procedure, control returns to step 3 (No).

Figure 5:
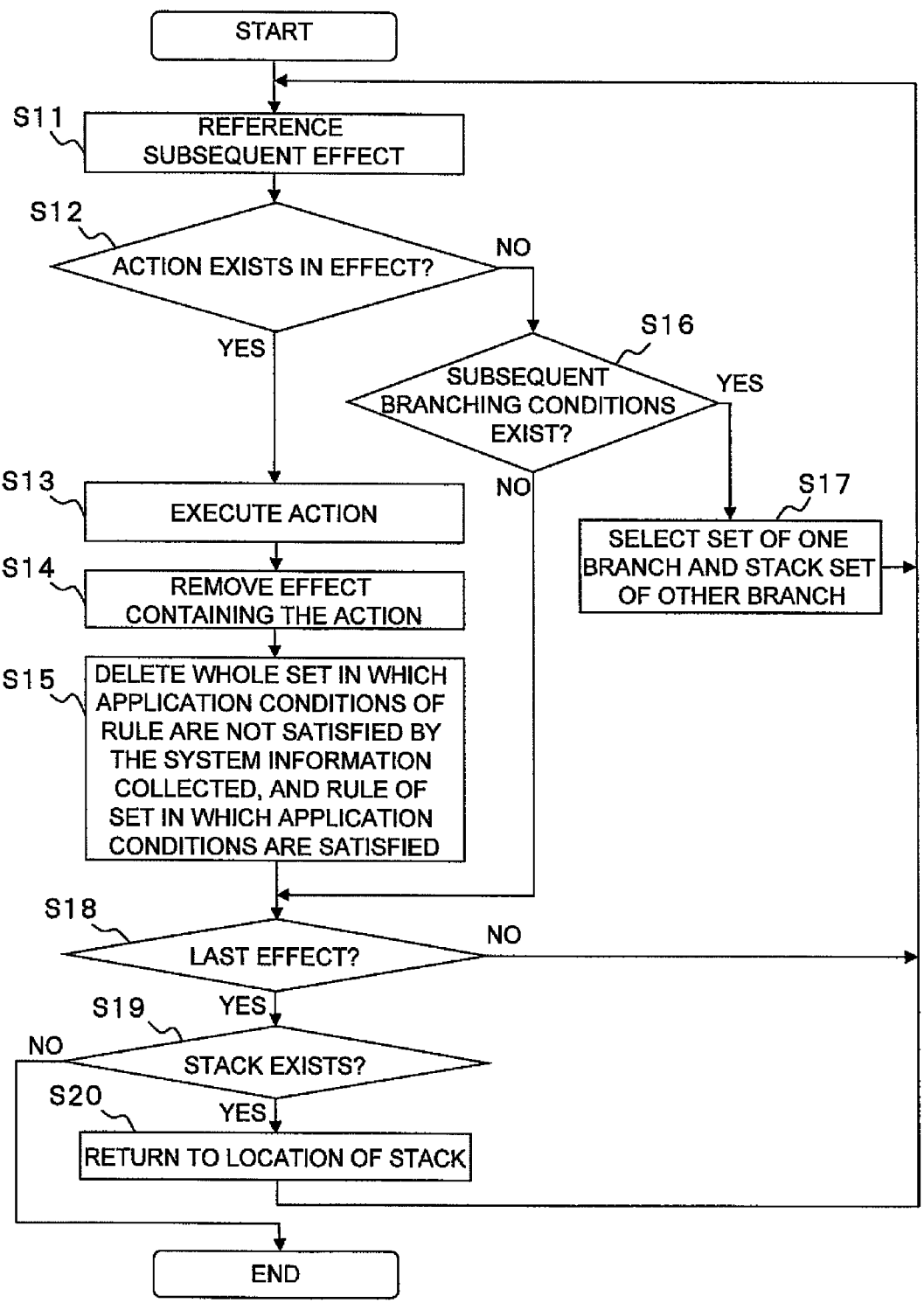
FIG. 5 is a flow chart of the content of a subroutine of a troubleshooting procedure abridging process.

FIG. 5 illustrates the content of a subroutine of the troubleshooting procedure abridging process.

In step 11, the subsequent effect of the acquired troubleshooting procedure is referenced.

In step 12, it is determined whether or not there is an action in the referenced effect. If there is an action, control proceeds to step 13 (Yes). If there is no action, control proceeds to step 16 (No).

In step 13, the action is executed, and system information associated with the input request is acquired from the information source of the system information.

In step 14, the effect containing the concerned action is deleted. This process is executed to abridge the troubleshooting procedure because the system information that is requested to the operator to input by the presentation content of the effect, is collected automatically by executing the action, making the effect itself that performs the input request unnecessary.

In step 15, the whole set in which the application conditions established in the rule as branching conditions are not satisfied under the system information that is collected automatically by the action being executed, is deleted. Furthermore, regarding the set in which the application conditions established in the rule are satisfied by the system information, only the rule is deleted. In the case in which a plurality of application conditions is contained in the rule, regarding a set in which the system information collected automatically relates to only a part of the application conditions contained in the rule, only those related application conditions are deleted.

In step 16, it is determined whether or not there are branching conditions subsequent to the effect currently being processed, that is, whether or not there is a plurality of candidates for the set to be processed subsequently and there is a state in which some candidates are applied exclusively depending on the conditions. Next, in the case in which there are branching conditions, control proceeds to step 17 (Yes), whereas in the case in which there are no branching conditions, control proceeds to step 18 (No).

In step 17, the set associated with the branching conditions is selected, and the other sets are stacked. They are simply saved temporarily in a stack so that they are made objects to be processed later in order to process all of the plurality of sets applied exclusively.

In step 18, it is determined whether or not the currently processed one is the last effect. If it is the last effect, control proceeds to step 19 (Yes), and if it is not the last effect, control returns to step 11 (No).

In step 19, it is determined whether or not there is a stack. If there is a stack, control proceeds to step 20 (Yes), and if there is no stack, control terminates.

In step 20, control returns to the position of the stack, and furthermore, returns to step 11 and continues the process.

Here is a description regarding how a troubleshooting procedure is abridged in this troubleshooting procedure abridging process, with specific examples.

SPECIFIC EXAMPLE 1

Figure 6:
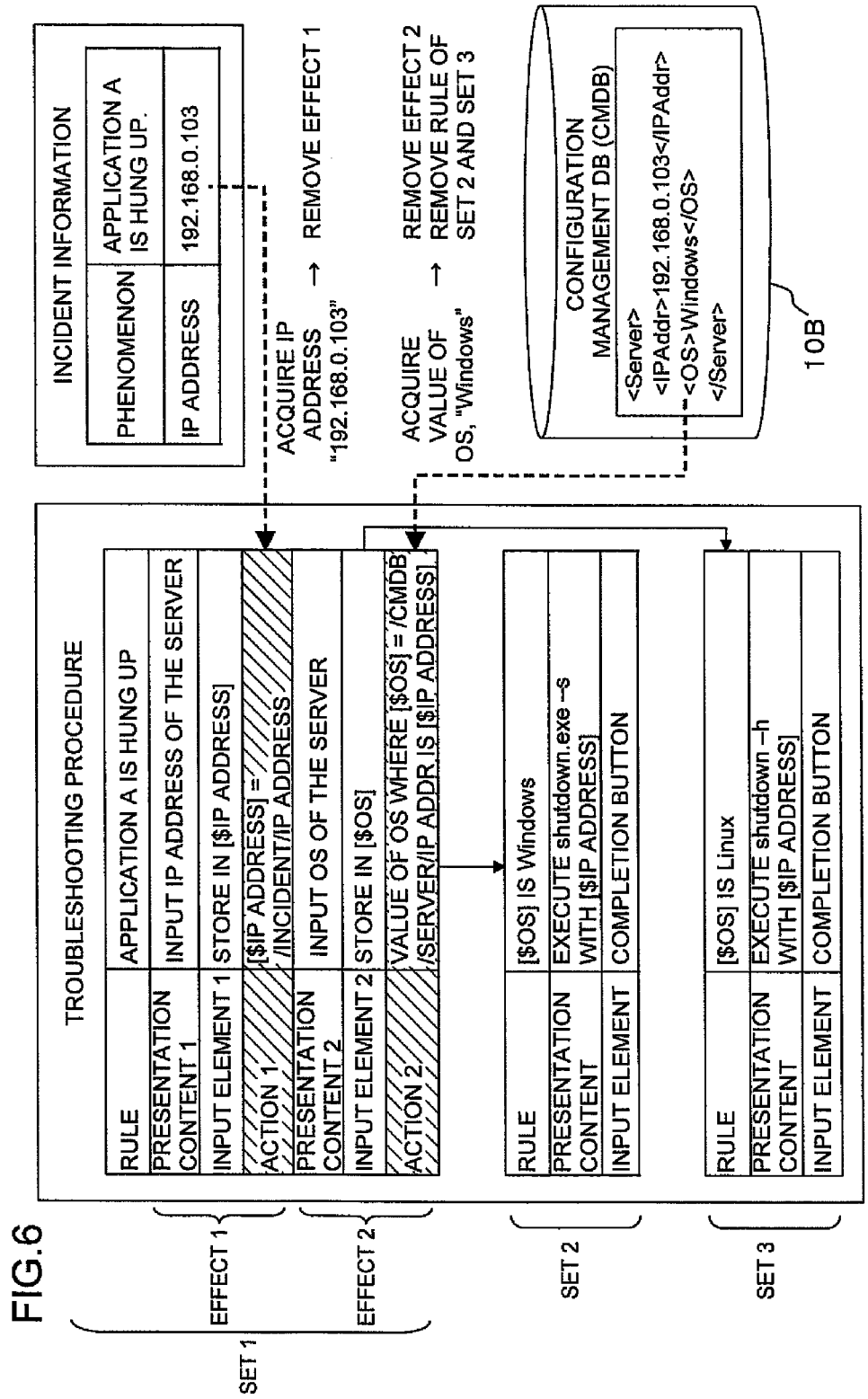
FIG. 6 is an explanatory diagram of a specific example in which system information is collected by actions being executed.

FIG. 6 is an explanatory diagram of how system information is collected by an action being executed, in a process for abridging the troubleshooting procedure illustrated in FIG. 2.

With respect to the troubleshooting procedure illustrated in FIG. 6, in the troubleshooting procedure abridging process, firstly, effect 1 of set 1 of the troubleshooting procedure is referenced (step 11). Since the effect 1 contains action 1, action 1 is executed (steps 12 and 13). At this time, in action 1, as illustrated in FIG. 6, the IP address "192.168.0.103" is acquired from the incident information, and is stored in "$IP address". Then, effect 1 containing the concerned action 1, that is, presentation content 1, input request 1, and action 1, is deleted (step 14). Furthermore, the subsequent effect 2 is referenced (step 11), action 2 is executed, and "Windows", being the value of the OS of the server whose IP address is "192.168.0.103", is acquired from the configuration management DB 10B, and stored in "$OS" (steps 12 and 13). Then, the effect containing the concerned action 2, that is, presentation content 2, input request 2, and action 2, is deleted (step 14). Here, since "Windows" is stored in "$OS" by action 2, the rule of set 2 is satisfied, while the rule of set 3 is not satisfied. Therefore, the whole of set 3 is deleted, and also the rule of set 2 is deleted (step 15). Then since there is no action in the effect of the subsequent set 2, set 3 has already been deleted, and the subsequent effect does not exist, the concerned troubleshooting procedure abridging process terminates (steps 11, 16, 18, and 19).

Figure 8:
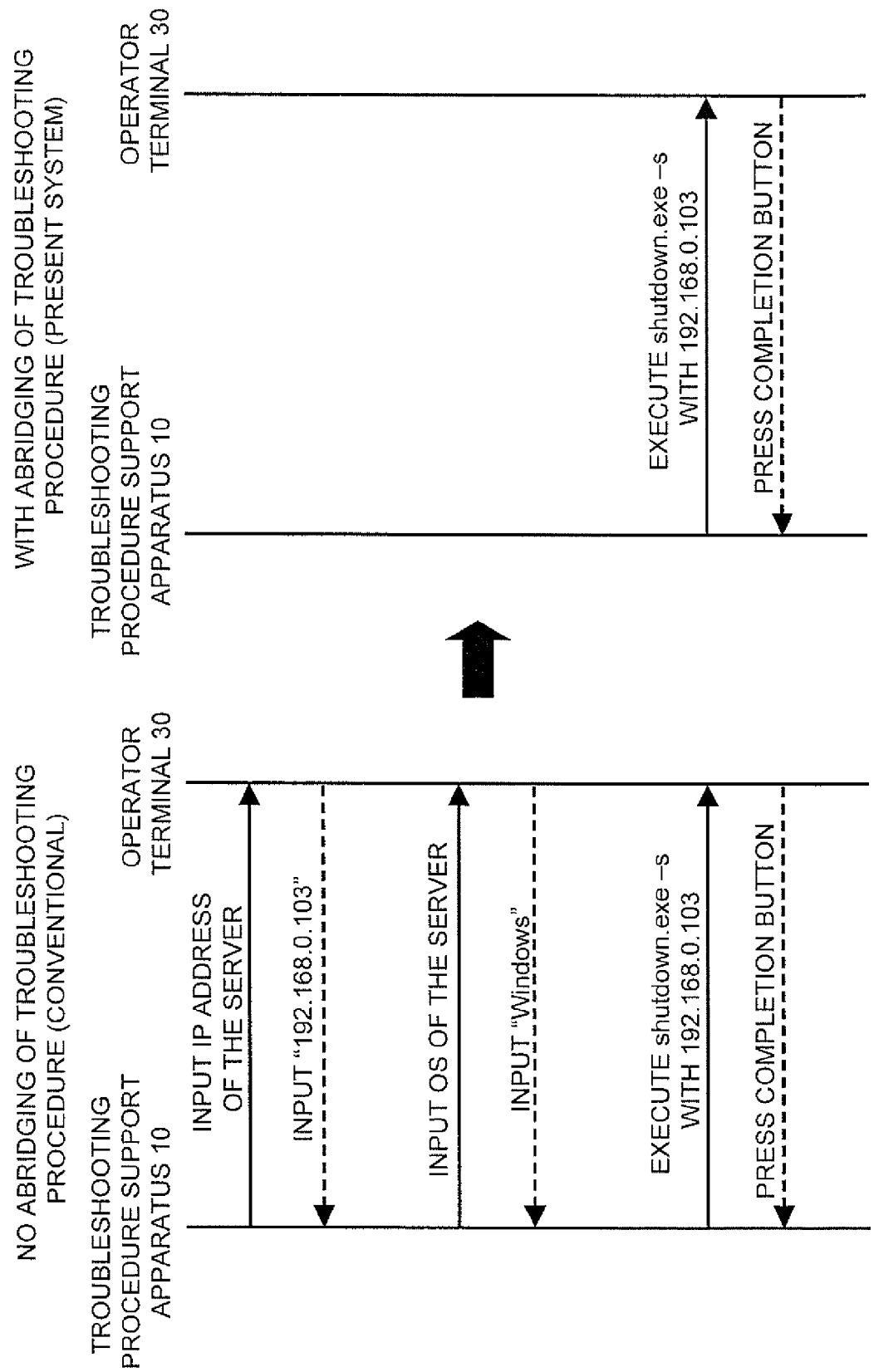
FIG. 8 is an explanatory diagram of the flow of presenting a troubleshooting procedure.

As a result of this troubleshooting procedure abridging process, the troubleshooting procedure as illustrated in FIG. 6 is abridged as shown in FIG. 7. Then based on the abridged troubleshooting procedure, a troubleshooting procedure is presented to the operator. Here FIG. 8 respectively illustrates a conventional presentation of a troubleshooting procedure in which the above-described troubleshooting procedure abridging process is not performed, and the presentation of a troubleshooting procedure based on the abridged troubleshooting procedure. As illustrated in FIG. 8, in the case in which abridging is performed in the troubleshooting procedure, the operator does not need to perform investigative operations of system information related to the IP address and OS of a server. In this manner, according to the troubleshooting support apparatus 10 of the present system, the troubleshooting procedure presented to the operator terminal 30 is significantly simplified.

SPECIFIC EXAMPLE 2

Figure 9:
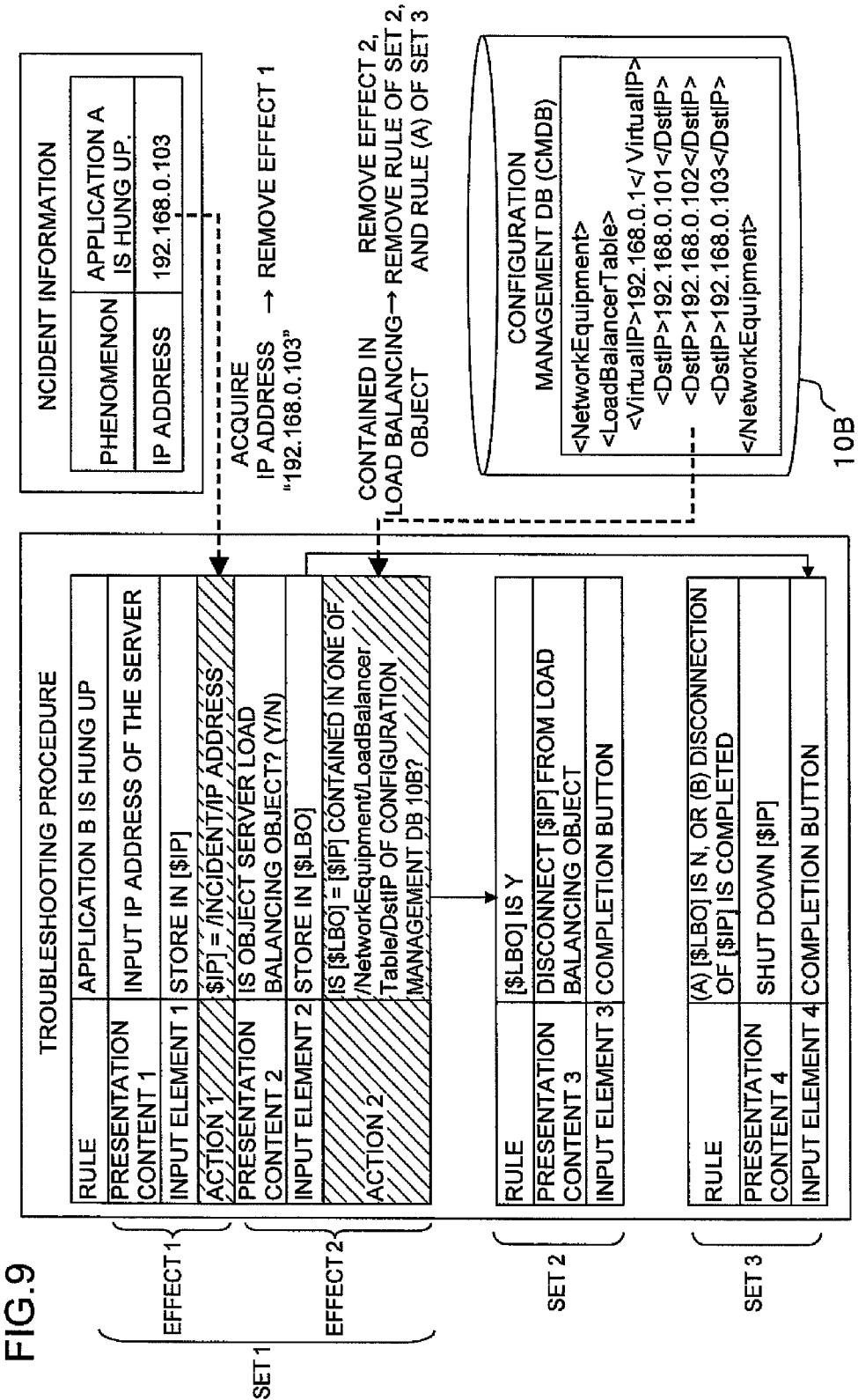
FIG. 9 is an explanatory diagram of a specific example in which system information is collected by actions being executed.

FIG. 9 is an explanatory diagram of how, in the case in which a troubleshooting procedure is abridged based on another troubleshooting procedure, system information is collected by actions being executed.

Also in this troubleshooting procedure, in the troubleshooting procedure abridging process, similarly to the above-described specific example 1, an IP address, "192.168.0.103", is acquired, being an object of incident information, and is stored in "$IP address". Moreover, the effect 1 containing the concerned action 1, that is, presentation content 1, input request 1, and action 1, is deleted (steps 11 to 14). Furthermore, the subsequent effect 2 is referenced (step 11), and action 2 is executed (steps 12 and 13). In this action 2, with reference to the configuration management DB 10B, it is determined whether or not the server whose IP address is "192.168.0.103" is a load balancing object (Y/N). In this example, since the concerned server is a load balancing object, "Y" is stored in "$LBO", being an internal variable. Then, effect 2 containing the concerned action 2, that is, presentation content 2, input element 2, and action 2, is deleted (step 14). Here since in action 2, "Y" is stored in "$LBO", the application conditions established in the rule of set 2 are satisfied. On the other hand, the rule of set 3 contains the condition (A) "$LBO" is N, which is associated with the value of "$LBO" acquired by this action 2, and the condition (B) "disconnection is completed", which is not associated with the value of "$LBO". As a result, the rule of set 2 is deleted, and, on the other hand, only the application conditions of (A) of the rule of set 3 are deleted (step 15). Moreover there is no action in the effect of the subsequent set 2, and there is no branching condition subsequently either. Moreover, since there is no action in the effect of set 3, and there is no subsequent set and no stack, the concerned troubleshooting procedure abridging process is terminated (steps 11, 16, 18 and 19).

Figure 10:
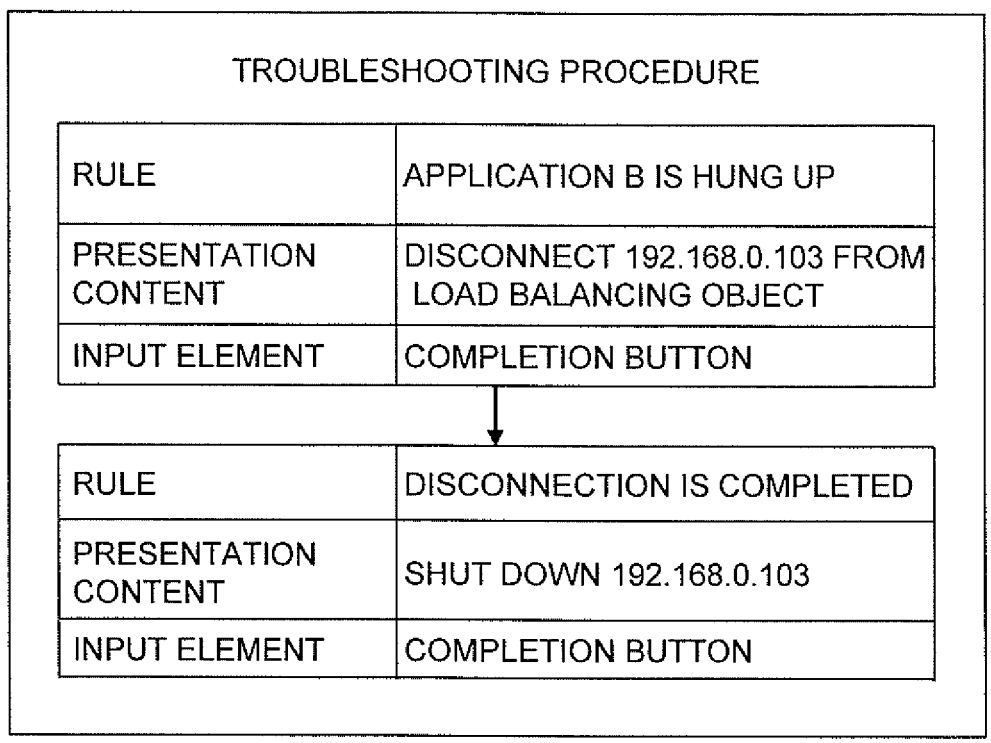
FIG. 10 is an explanatory diagram of a troubleshooting procedure after the abridging process.
Figure 11:
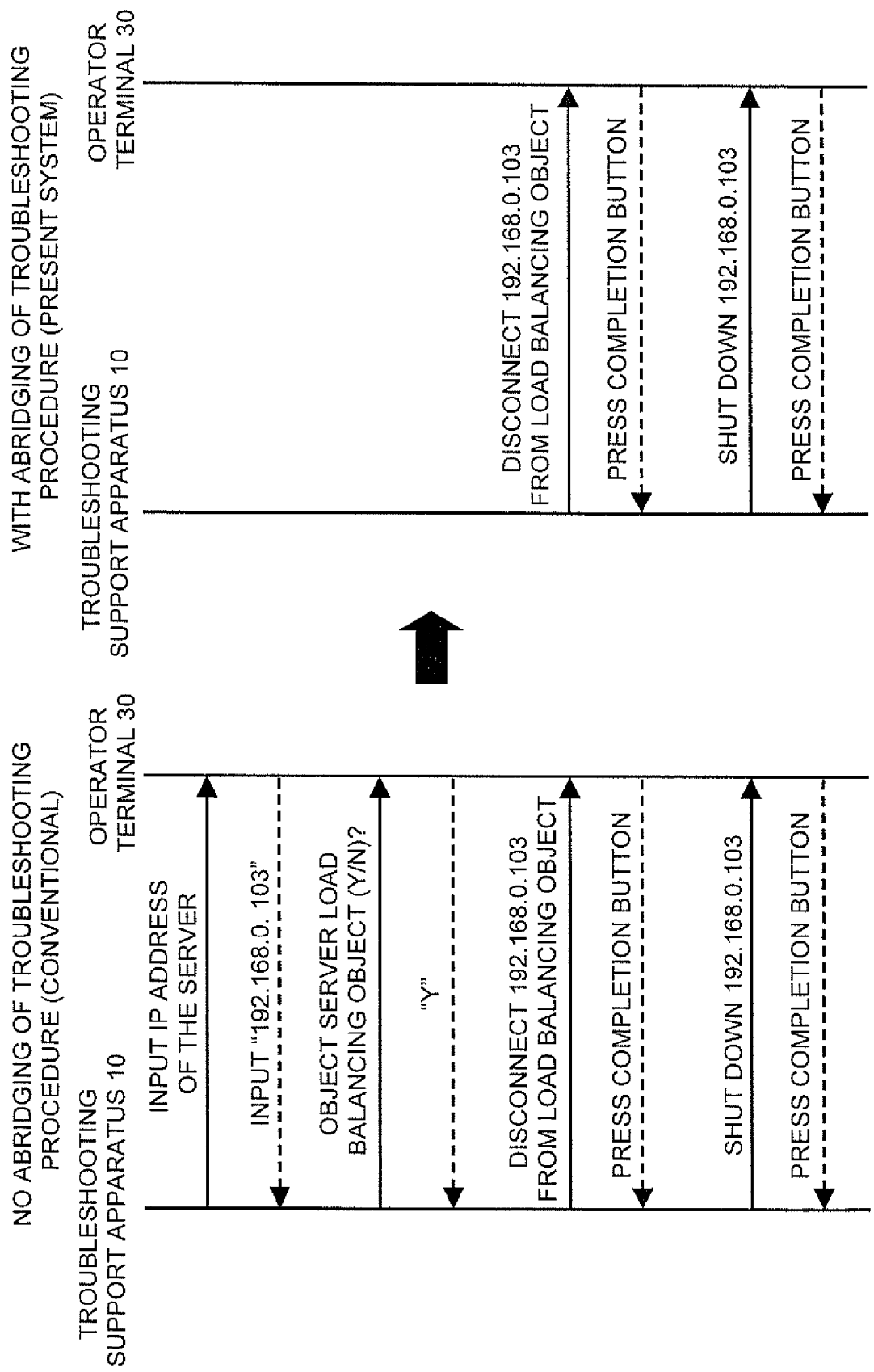
FIG. 11 is an explanatory diagram of the flow of presenting a troubleshooting procedure.

As a result of this troubleshooting procedure abridging process, the troubleshooting procedure illustrated in FIG. 9 is abridged as illustrated in FIG. 10. Then, the abridged troubleshooting procedure is presented to the operator in a first troubleshooting procedure presenting process (steps 3 to 7). FIG. 11 respectively illustrates the flow of the presentation of a conventional troubleshooting procedure in which such a troubleshooting procedure abridging process has not been performed, and the presentation of the troubleshooting procedure based on such an abridged troubleshooting procedure. Also in this example, as illustrated FIG. 11, in the case in which the troubleshooting procedure abridging process is executed, the operator does not need to perform investigative operations of the system information related to the server IP address or whether or not it is a load balancing object, so that the troubleshooting procedure presented to the operator terminal 30 is significantly simplified.

Incidentally, in the above-described first troubleshooting procedure presenting process, regarding the troubleshooting procedure acquired from the troubleshooting procedure DB 10A, after the troubleshooting procedure abridging process is completed, a troubleshooting procedure is presented to the operator terminal 30. However, the arrangement may also be such that each of the presentation content of the troubleshooting procedure is presented, and while receiving input from the operator, the troubleshooting procedure is abridged dynamically. Hereunder is a description of such a second troubleshooting procedure presenting process.

Figure 12:
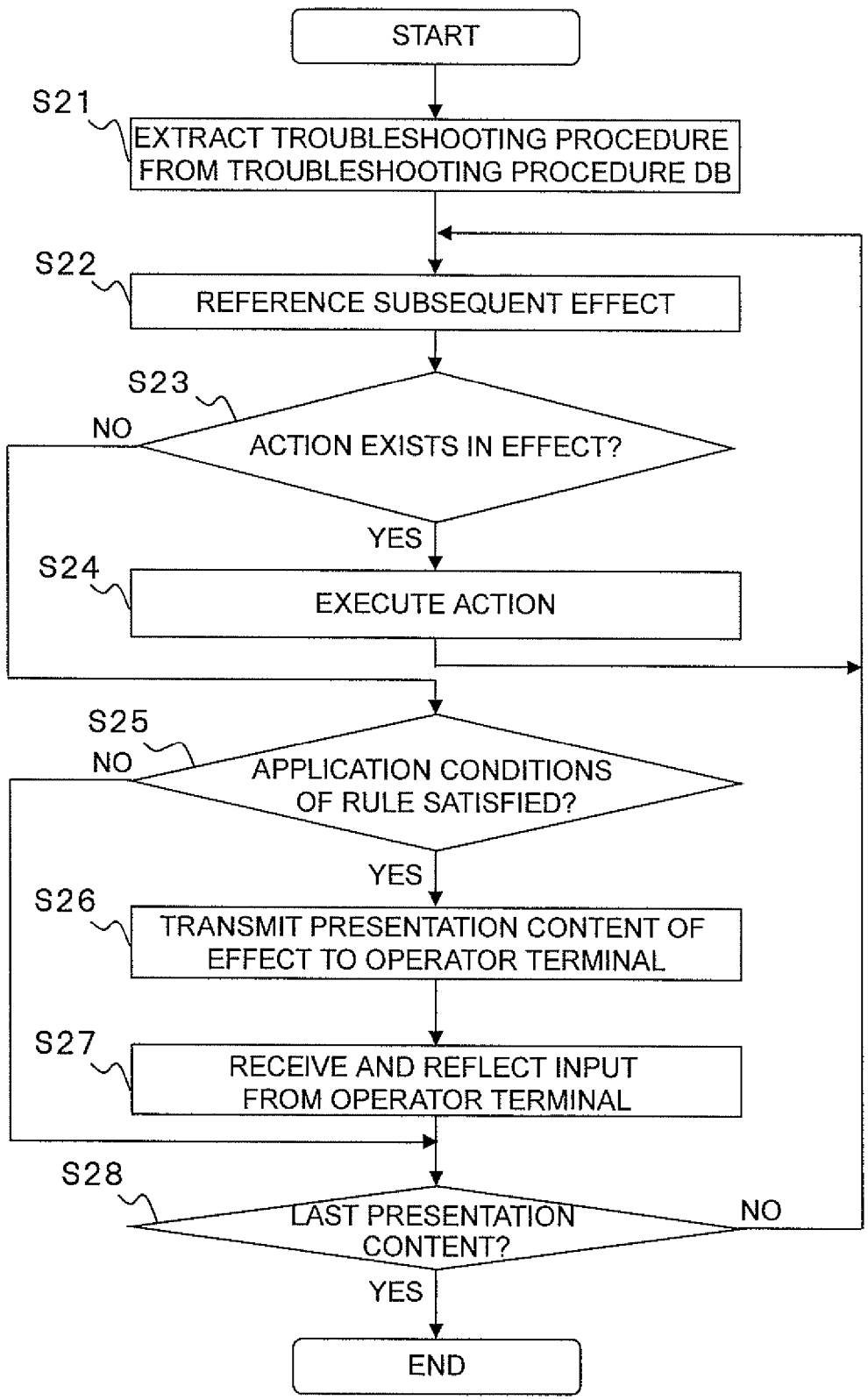
FIG. 12 is a flow chart of the content of a second troubleshooting procedure presenting process.

FIG. 12 illustrates the content of the second troubleshooting procedure presenting process. This process is executed when the incident receiving section 10C receives incident information from the operations administration object system 30.

In step 21, depending on the content of the problem specified by the received incident information, a troubleshooting procedure in which the application conditions established in the rules are satisfied, is acquired from the troubleshooting procedure DB 10A.

In step 22, the subsequent effect of the acquired troubleshooting procedure is referenced.

In step 23, it is determined whether or not there is an action in the referenced effect. If there is an action, control proceeds to step 24 (Yes), and if there is no action, control proceeds to step 25 (No).

In step 24, an action is executed, and system information associated with an input request is acquired from the information source of the system information.

In step 25, it is determined whether or not the application conditions established in the rules of a set in which the concerned effect is contained are satisfied. If the application conditions of the rule are satisfied, control proceeds to step 26 (Yes), and if the application conditions of the rule are not satisfied, control proceeds to step 28 (No).

In step 26, the presentation content of the effect is transmitted to the operator terminal 30. The operator terminal 30 which receives this presentation content, receives the input requested by the presentation content.

In step 27, the input content is received from the operator terminal 30, and this is reflected to an internal variable or the like depending on the input element of the concerned effect.

In step 28, it is determined whether or not the concerned effect is the last effect of the abridged troubleshooting procedure. In the case in which the effect is the last effect of the abridged troubleshooting procedure, the processing is terminated (Yes), and in the case in which the effect is not the last effect of the abridged troubleshooting procedure, control returns to step 22 (No).

Here is a detailed description of the second troubleshooting procedure presenting process using a specific example of the troubleshooting procedure of FIG. 6.

In this troubleshooting procedure, according to the second troubleshooting procedure presenting process, firstly, a troubleshooting procedure is extracted (step 21), and effect 1 of set 1 of the troubleshooting procedure is referenced (step 22). Since the effect 1 of this set 1 contains action 1, action 1 is executed (steps 23 and 24). At this time, in action 1, an IP address, "192.168.0.103", is acquired, being an object of incident information, and is stored in "$IP address". Then, the subsequent effect 2 is referenced (step 22), and action 2 is executed (steps 23 and 24). At this time, in action 2, the configuration management DB 10B is referenced, "Windows", being the value of the OS of the server whose IP address is "192.168.0.103", is acquired and stored in "$OS". Furthermore, the effect of the subsequent set 2 is referenced (step 22). At this time, since there is no action in the effect of set 2, and the application conditions of the rule are satisfied (steps 23 and 25), the presentation content of the concerned effect 2 is transmitted to the operator terminal 30 (step 26). Then, the pressing of an end button, being an input from the operator terminal 30, is received. Regarding the subsequent set 3, since the application conditions established in the rule are not satisfied, no processing is performed (steps 22, 23, 25, and 28).

Also, using the second troubleshooting procedure presenting process as described above, similarly to the case in which a troubleshooting procedure is presented after completing the above-described troubleshooting procedure abridging process in advance, the presentation of the troubleshooting procedure as illustrated in FIG. 8 is performed. In this manner, even in the case in which the troubleshooting procedure is abridged dynamically, the investigative operations by the operator can be reduced, and also the troubleshooting procedure presented to the operator can be simplified.

Incidentally, the second troubleshooting procedure presenting process as described above has the following difference compared with the case in which the troubleshooting procedure is presented to the operator terminal 30 after the troubleshooting procedure abridging process is completed as in the first troubleshooting procedure presenting process. For example, in a case in which the application conditions established in a rule are branching conditions where there is an exclusive relationship between it and other rules, it is not determined which set associated with which branching is applied, if system information is not collected automatically and it is not input from an operator. In this case, as in the first troubleshooting procedure presenting process, in the case in which the troubleshooting procedure is presented to the operator terminal 30 after completing the troubleshooting procedure abridging process, the actions with respect to both sets associated with such branching conditions is executed and the effects that can be removed is removed in advance. On the other hand, according to the second troubleshooting procedure presenting process, it is determined whether the application conditions, being the branching conditions of the rule, are satisfied, after the input of the system information from the operator. Then, actions are executed and effects are removed associated only with the set in which the application conditions established in the rule are satisfied. Accordingly, even though system information is not collected in part, the second trouble shooting procedure realizes reducing total amount of the investigative operations by the operator. Furthermore, it is necessary to execute the action in a set that is not presented to the operator, so that the amount of internal processing is reduced.

For example, consider a case in which action 2 is not contained in set 1 of the troubleshooting procedure illustrated in FIG. 2. In this case, if the operator does not input the value of the OS regarding the presentation content 2, it may not be determined which one of set 2 and set 3 is applied. In such a troubleshooting procedure, according to the second troubleshooting procedure presenting process, it is determined whether the branching conditions are satisfied after the value of the OS is input by the operator. Therefore, in the case in which an action is contained in set 2 and set 3, it is not necessary to execute the action in a set that is not presented to the operator.

In this manner, in the troubleshooting support apparatus of the present system, an action to collect system information automatically is assigned in advance to an input request to the operator for system information within the presentation content of the troubleshooting procedure, in the case in which the system information associated with the input request can be automatically collected instead of from input by the operator. Then, when a problem occurs, system information is collected automatically according to this action, and the effect containing a request to input such system information is removed. As a result, it is not necessary for the operator to perform investigative operations with respect to this system information, so that the time and effort required for troubleshooting can be reduced significantly. Furthermore, since the amount of presentation content of the troubleshooting procedure presented to the operator is reduced, and the troubleshooting procedure is simplified, it also possible to prevent processing errors by the operator. Accordingly, speedy and accurate troubleshooting operation is possible, so that it is possible to minimize the loss caused by a problem.

In the present system, the troubleshooting support apparatus and the operator terminal are separate devices connected via a network. However, the troubleshooting support apparatus and the operator terminal may be the same device. That is, an operator may perform troubleshooting operations via input and output devices provided in the troubleshooting support apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a troubleshooting support program causing a computer to execute a process, the process comprising:
   extracting a troubleshooting procedure that comprises operation content and an input request that requests an input of system information to an operator, wherein the operation content and the input request of the troubleshooting procedure are to be presented to the operator, a command to collect the system information requested in the input request from an information source of the system information is assigned to the input request, and a branching condition, for determining whether or not to present the operation content and the input request, is assigned to the operation content and the input request, when a problem occurs in a computer system;
   collecting the system information from the information source of the system information, according to the command assigned to the input request of the troubleshooting procedures;
   omitting, from the troubleshooting procedure, the input request that requests the input of the collected system information, and the operation content and the input request to which the branching condition is assigned and the branching condition is not satisfied by the collected system information; and
   presenting to the operator, the troubleshooting procedure in which the input request has been omitted.

2. The computer-readable, non-transitory medium according to claim 1, wherein
   the troubleshooting procedure further comprises an application condition of the troubleshooting procedure, and
   the extracting process, based on incident information specifying the content of the problem, extracts from a database in which a plurality of troubleshooting procedures are stored, a troubleshooting procedure of which the application condition matches the content of the problem of the incident information.

3. The computer-readable, non-transitory medium according to claim 1, wherein
   the collecting process collects the system information from at least incident information specifying a source of the problem or a database in which management information of system components of the computer system is stored.

4. A troubleshooting support method executed on a computer, the method comprising:

extracting, a troubleshooting procedure that comprises operation content and an input request that requests an input of system information to an operator, wherein the operation content and the input request of the troubleshooting procedure are to be presented to the operator, a command to collect the system information request in the input request from an information source of the system information is assigned to the input request, and a branching condition, for determining whether or not to present the operation content and the input request, is assigned to the operation content and the input request, when a problem occurs in a computer system;

collecting the system information from the information source of the system information, according to the command assigned to the input request of the troubleshooting procedures;

omitting, from the troubleshooting procedure, the input request that requests the input of the collected system information, and the operation content and the input request to which the branching condition is assigned and the branching condition is not satisfied by the collected system information; and presenting to the operator, the troubleshooting procedure in which the input request has been omitted.

5. A troubleshooting support method according to claim 4, wherein the troubleshooting procedure further comprises an application condition of the troubleshooting procedure, and the extracting process, based on incident information specifying the content of the problem, extracts from a database in which a plurality of troubleshooting procedures are stored, a troubleshooting procedure of which the application condition matches the content of the problem of the incident information.

6. A troubleshooting support method according to claim 4, wherein the collecting collects the system information from at least incident information specifying a source of the problem or a database in which management information of system components of the computer system are is stored.

7. A troubleshooting support apparatus comprising:

an extracting device for, when a problem occurs in a computer system, extracting a troubleshooting procedure that comprises operation content and an input request that requests an input of system information to an operator, wherein the operation content and the input request of the troubleshooting procedure are to be presented to the operator, a command to collect the system information requested in the input request from an information source of the system information is assigned to the input request, and a branching condition, for determining whether or not to present the operation content and the input request, is assigned to the operation content and the input request;

a collection device for collecting the system information from the information source of the system information, according to the command assigned to the input request of the troubleshooting procedures;

an omitting device for omitting, from the troubleshooting procedure, the input request that requests the input of the collected system information, and the operation content and the input request to which the branching condition is assigned and the branching condition is not satisfied by the collected system information; and a presentation device for presenting to the operator, the troubleshooting procedure in which the input request has been omitted.

8. A troubleshooting support apparatus according to claim 7, wherein the troubleshooting procedure further comprises an application condition of the troubleshooting procedure, and the extracting device, based on incident information specifying the content of the problem, extracts from a database in which a plurality of troubleshooting procedures are stored, a troubleshooting procedure of which the application condition matches the content of the problem of the incident information.

9. A troubleshooting support apparatus according to claim 7, wherein the collection device collects the system information from at least incident information specifying a source of the problem or a database in which management information of system components of the computer system are is stored.

* * * * *